United States Patent Office 3,230,406
Patented Jan. 18, 1966

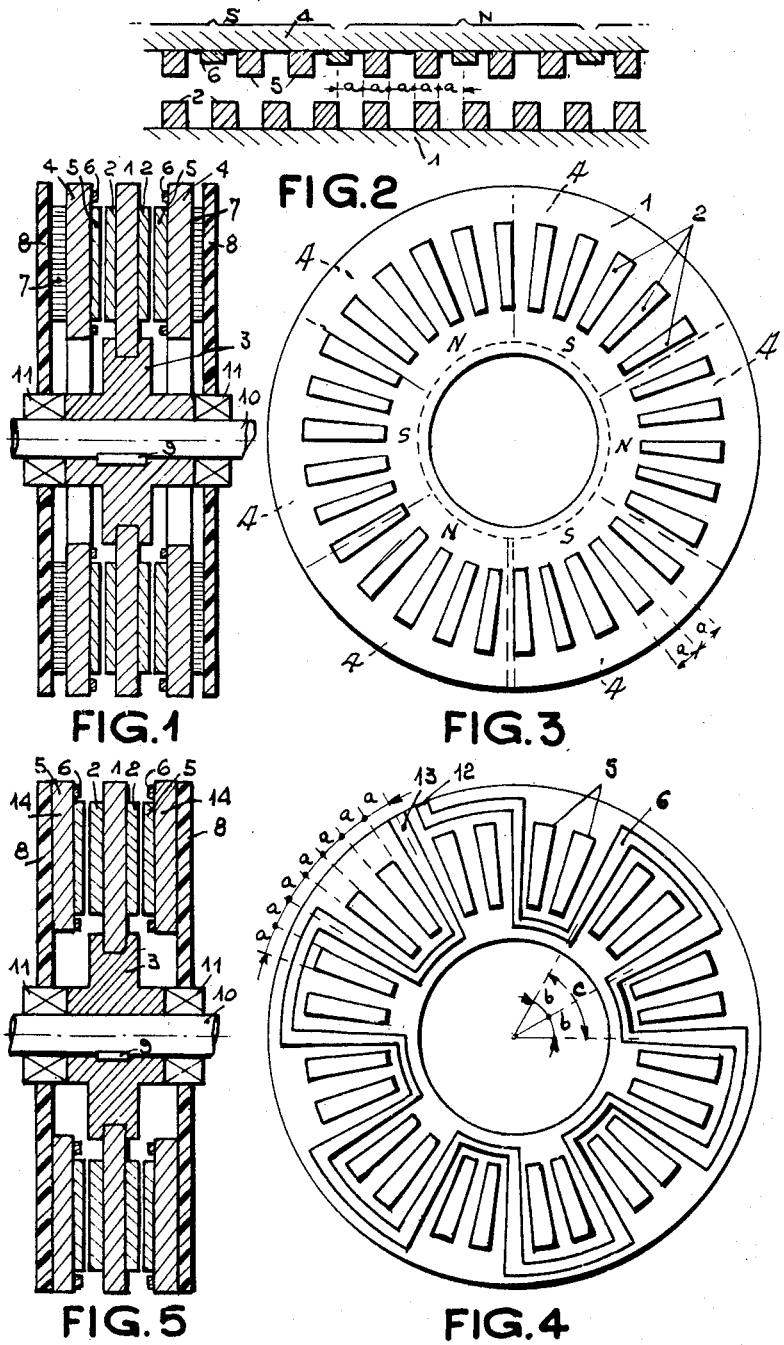

3,230,406
HIGH FREQUENCY ELECTROMECHANICAL
GENERATOR
Jacques Henry-Baudot, Antony, France, assignor to
Printed Motors Inc., New York, N.Y.
Filed Apr. 15, 1960, Ser. No. 22,507
Claims priority, application France, May 12, 1959,
794,638, Patent 1,234,263
13 Claims. (Cl. 310—155)

The present invention relates to improvements in high frequency electromechanical generators.

An object of the invention is to devise a high frequency electromechanical generator operating on the principle of modulating a permanent magnetic multipolar field in a simple and efficient structural arrangement of the rotor and stator members thereof.

A further object of the invention is to so devise said high frequency electromechanical generator structure that it is readily adaptable to the so-called "printed circuit" techniques for making at least part of said generators.

The invention is primarily concerned with axial airgap rotating machines though it may easily be adapted also to the design of radial airgap machines.

Briefly summarized, a high frequency electromechanical generator according to the invention comprises a rotor member and at least one stator member for defining a magnetic airgap wherein a permanent magnetic flux is established as one of said members incorporates an inductor pole structure; the rotor member comprises on the airgap face of a magnetic base piece, evenly distributed constant pitch magnetic teeth. The stator member is provided on the airgap face of a magnetic base piece with first, evenly distributed groups of constant pitch magnetic teeth, said groups being spaced by intervals widened by a fraction of said pitch, and secondly with an evenly developed winding around said groups of teeth for collecting the high frequency current derived from the interaction of said permanent magnetic flux and said magnetic teeth arrangement.

In an axial airgap machine, the rotor member is placed between two identically made and duly registering stator members so that the axial magnetic attractions are balanced out in the machine.

When a true A.C. waveform is required for the collected high frequency current, the said fraction of pitch is made equal to one-half of said pitch in the intervals between the groups of stator teeth.

The stator winding is preferably a "printed circuit" winding, i.e. of bare and flat conductors intimately adhering to an insulating structure and, preferably further, in such a case, the insulating surface is obtained by forming at least that part of the magnetic base piece facing the airgap of a magnetic and insulating material.

These and further features will be more fully described with relation to the accompanying drawings, wherein:

FIG. 1 shows a cross-section through a first illustrative embodiment of a machine according to the invention;

FIG. 2 shows on a larger scale, part of a linear development of facing portions of the rotor and stator members of the machine;

FIG. 3 shows a front view of one face of the rotor with the stator shown in dotted line and having the permanent magnet poles indicated thereon;

FIG. 4 shows a front view of one face of the stator, facing the airgap; and

FIG. 5 shows a cross-section through a modification of a machine according to FIG. 1.

The difference between the embodiments of FIGS. 1 and 5 lies in the fact that, in FIG. 1, mechanically separated magnetic poles are included in the structural arrangement whereas in FIG. 5 said poles are considered as "impressed" by magnetic treatment into a highly coercive and remanent material.

The examples concern axial airgap machines; consequently, the members are made discoidal. The transposition to radial airgap machines with cylindrical members is quite apparent.

For the sake of clarity of the drawings, the number of magnetic teeth, either in the rotor or the stator member is shown reduced with respect to actual practice reaching machines capable of delivering electrical A.C. currents of such high frequencies as 10,000 Hz. and higher ones. For instance, a machine according to the invention, having six permanent magnetic poles and twelve modulating poles, each of which comprises a group of 11 teeth, and the rotor comprising 150 teeth, the frequency is 15,000 Hz. at a rotation speed equal to 6,000 r.p.m.

The shown examples concern a six pole machine, each pole spanning an arc $c$ equal to 60°, and twelve modulating poles, each one spanning an arc $b$ equal to 30°, FIG. 4.

The angular pitch of the rotor teeth, FIG. 3 is made equal to a certain value $2a$ and the same pitch is provided for the stator teeth, as shown in FIG. 4, within any one of the groups of teeth in the stator member. The figures show the half-pitch $a$ so that in FIG. 4 it is easily seen that, between the groups of teeth, the pitch is increased by $a$. Said relation is also obvious from the plane development of FIG. 2.

In the axial airgap machines illustrated, two stator members are provided, one on each side of the rotor. Such an arrangement seeks to eliminate the stray magnetic attraction of the rotor by each one of the stator members. It will be of no interest in coaxial arrangement of members.

The rotor member 1 is made of a ring of a magnetic material, which is preferably also an insulating material such as certain ferrites, provided on both faces with evenly distributed radial and sectorial teeth 2, registering from one face to the other one. The rotor is mounted on a hub 3 secured by a pin 9 to a shaft 10. Said shaft may be supported by bearings 11 mounted in base plates 8, each in a non-magnetic and non-conducting material.

Each stator member comprises a plurality of groups of teeth 5 and between said groups a winding of substantially sectorial turns is provided, the continuity of which forms at least one spiral winding 6 ending on terminals 12 and 13 on the member proper (external outputs are not shown). Said groups and said winding are applied over the polar face of a permanent magnet multipole structure.

In FIG. 1, the machine includes six permanent magnets 4 carried by a magnetic yoke 7, for instance in a spiral of magnetic tape, mounted on a base plate 8. The polar pieces of the magnets 4, each in a material such as anisotropic coercive ferrite for instance, are shaped to be substantially contiguous over the airgap surface so that the interstices or yokes therebetween are quite narrow and easily filled by a resin for finally smoothing the said airgap facing surface and enabling the application thereon of the magnetic teeth and the winding associated with said groups of teeth. In FIG. 5, the structure is simplified in that the magnetic poles are directly formed by a conventional magnetisation treatment in a ring 14 made of an anisotropic coercive ferrite.

As a modification to FIG. 5, the stator may not incorporate the magnetic poles but the rotor may incorporate said poles, as it does not make any difference to the operation of the machine that such permanent magnetic poles are on the rotor part or on the stator part of the structure. Of course, the rotor may be made with magnets but this would in most cases unduly load the rotating part of the machine.

The operation may be summarized as follows: the rotation of an even distribution of magnetic teeth with respect to the groups of teeth making the modulating poles, ensures the modulation of the permanent magnetic flux at the frequency defined by the number of teeth, of groups of teeth and of poles in the machine, as also by the speed of rotation of the rotor. Said modulation induces an alternating current of corresponding frequency in the stator winding (or windings, such being serially connected).

The relative height of the teeth is small, for instance of the order of two- or three-tenths of a millimetre. The thickness of the conductors of the winding is smaller, of the order of one-tenth of a millimetre for instance. Consequently, said winding will be preferably made through the use of a printed circuit technique for obtaining such a dimension and yet capable of carrying a current of suitable value.

If possible, the magnetic teeth will be formed integrally with their supporting base piece and this may be done by machining or moulding. When machining or moulding is not possible, the magnetic teeth may be made by the application of a printed circuit technique, engraving in some way a ring of magnetic and "soft" material applied over the "hard" magnetic base piece. If for instance, the engraving comprises the use of an acid, photoetching process, which is able to attack the magnetic material for the etching of a magnetic material (for instance such a material as known in France under the commercial denomination of "Anhyster D") and a further acid for attacking the conductor material of the winding, for instance electrolytic copper (OFHC).

The shown winding is made as a single spiral, it may be formed by a multiple spiral when the relative dimensions of the intervals between groups of teeth and of the width of the conductors permit such an arrangement.

What I claim is:

1. A high frequency electromechanical generator comprising: a rotor member; and at least one stator member positioned to define with said rotor member a permanent magnetic flux airgap therebetween, one of said members incorporating an inductor multipolar structure, said rotor member comprising, on the airgap face of a magnetic base piece, evenly distributed and constant pitch magnetic teeth and said stator member comprising, on the airgap face of a magnetic base structure, evenly distributed groups of constant pitch magnetic teeth, said groups being spaced apart by one pitch plus a fraction of said pitch, and an evenly developed winding around said groups of teeth.

2. High frequency generator according to claim 1, wherein the machine is of the axial airgap type having a pair of stator members of identical design positioned on opposite sides of the rotor and in registering angular relationship with each other.

3. High frequency generator according to claim 1, wherein the said fraction of pitch is made equal to one-half of the pitch of the teeth.

4. High frequency generator according to claim 1, wherein at least one of the magnetic base pieces is integral with the magnetic teeth it carries.

5. High frequency generator according to claim 1, wherein one at least of said base pieces comprises a single magnetic member having a magnetic plate overlying the airgap surface of said magnetic base piece, said plate having magnetic teeth formed integrally thereon.

6. High frequency generator according to claim 1, wherein the member incorporating the permanent poles comprises a unitary magnetic base piece in a highly coercive material wherein the said poles comprise magnetized areas of said material.

7. High frequency generator according to claim 1, wherein at least the magnetic base piece carrying said electrical winding comprises at least for the airgap surface thereof, a magnetic insulating material and said winding comprises bare and flat conductors intimately attached to the said insulating surface.

8. High frequency generator according to claim 1, wherein the member incorporating said permanent magnetic poles comprises a magnetic yoke plate, a plurality of permanent magnets equal in number to the number of poles, said magnets being provided with substantially contiguous pole faces.

9. High frequency generator according to claim 8, and including insulating resin moulded in situ between said magnets and pole faces thereof.

10. High frequency generator according to claim 8, wherein said magnetic teeth are integral with said pole faces and comprise an insulating magnetic material.

11. High frequency generator according to claim 8, said magnetic teeth are integral with a soft magnetic plate secured to said pole face surface.

12. High frequency generator according to claim 1, wherein the thickness of said winding conductors is made less than the thickness of said magnetic teeth.

13. High frequency generator according to claim 12, wherein said winding comprises at least one complete spiral of rectangular turns uniformly zigzaging between the said groups of teeth.

References Cited by the Examiner

UNITED STATES PATENTS

| | | | |
|---|---|---|---|
| 1,212,693 | 1/1917 | Ruckgaber | 310—268 |
| 2,303,293 | 11/1942 | Thomas | 310—254 X |
| 2,550,571 | 4/1951 | Litman | 310—268 |
| 2,722,617 | 11/1955 | Cluwen | 310—154 |
| 2,734,140 | 2/1956 | Parker | 310—268 |
| 2,824,275 | 2/1958 | Kober | 310—268 |
| 2,970,238 | 1/1961 | Swiggett | 310—268 |

FOREIGN PATENTS

| | | |
|---|---|---|
| 579,411 | 8/1946 | Great Britain. |
| 693,883 | 7/1940 | Germany. |

ORIS L. RADER, *Primary Examiner.*

MILTON O. HIRSHFIELD, DAVID X. SLINEY, *Examiners.*